United States Patent [19]

Holland et al.

[11] 4,323,653

[45] Apr. 6, 1982

[54] INHIBITING CRYSTALLIZATION OF OPAL GLASS COMPOSITIONS

[75] Inventors: Hans J. Holland, Painted Post; John E. Megles, Jr., Corning, both of N.Y.

[73] Assignee: Corning Glass Works, Corning, N.Y.

[21] Appl. No.: 254,901

[22] Filed: Apr. 16, 1981

[51] Int. Cl.³ .................................................. C03C 3/08
[52] U.S. Cl. ........................................ 501/32; 501/59
[58] Field of Search ...................................... 501/59, 32

[56] References Cited

U.S. PATENT DOCUMENTS

| | | | |
|---|---|---|---|
| 3,649,440 | 3/1972 | Megles | 428/410 |
| 3,661,601 | 5/1972 | Dumbaugh et al. | 501/59 |
| 3,673,049 | 6/1972 | Giffen et al. | 501/59 |
| 3,737,294 | 6/1973 | Dumbaugh et al. | 65/33 |

*Primary Examiner*—O. R. Vertiz
*Assistant Examiner*—Mark Bell
*Attorney, Agent, or Firm*—Clinton S. Janes, Jr.

[57] ABSTRACT

The instant invention is directed to the production of spontaneous opal glass compositions which limit the generation of $CaF_2$ and crystals having a xonotlite structure therein when heat treated at temperatures higher than the annealing point, but lower than the softening point of the glass. The glasses consist essentially, as analyzed in weight percent on the oxide basis, of about:

| | |
|---|---|
| $SiO_2$ | 64.5 ± 2.0 |
| $Al_2O_3$ | 6.25 ± 0.5 |
| $Na_2O$ | 3.0 ± 0.5 |
| $K_2O$ | 3.0 ± 0.5 |
| $MgO$ | 1.25 ± 0.3 |
| $B_2O_3$ | 4.5 ± 0.7 |
| F | 3.25 ± 0.5 |
| CaO | 14.5 ± 1.0 |

2 Claims, No Drawings

INHIBITING CRYSTALLIZATION OF OPAL GLASS COMPOSITIONS

BACKGROUND OF THE INVENTION

U.S. Pat. No. 3,673,049 discloses the production of laminated glass articles wherein each lamina exhibits a state of stress which is opposite to the state of stress demonstrated by the contiguous layer(s). Stated differently, the articles described consist of layers manifesting tensile and compressive stress in alternating relationship with one another. The laminated articles are prepared by bringing together streams of molten glass of differing compositions and viscosities such that the laminae are essentially simultaneously laid up in the desired structural order. As is explained therein, where a three-layer laminate is fabricated consisting of a relatively thick interior or core portion surrounded with a thin surface or skin layer, the skin layer displaying a lower coefficient of thermal expansion than the core portion, the surface laminae will be under compression and the interior portion under tension. The surface compression layer imparts greatly enhanced overall mechanical strength to the resultant body.

Because three-ply laminates can be made of very thin cross section but with high mechanical strength, such products have been utilized as tableware where the skin and/or core portion is an opal glass. For example, tableware marketed by Corning Glass Works, Corning, New York, under the trademark CORELLE ®, consists of a three-ply laminate wherein the core portion is a spontaneous opal and the skin glass is clear, the skin glass having a lower coefficient of thermal expansion than the opal interior portion.

U.S. Pat. No. 3,673,049 discloses a group of spontaneous opal glasses stated to be especially suitable for use in a three-ply laminate, those glasses consisting essentially, by weight on the oxide basis, of

| | |
|---|---|
| $SiO_2$ | 50–75 |
| $Al_2O_3$ | 3–20 |
| Alkali Metal Oxide | 3–20 |
| Alkaline Earth Metal Oxide | 0–20 |
| $B_2O_3 + CeO_2 + Bi_2O_3 + PbO + GeO_2 + CdO + ZnO + Ta_2O_5 + ZrO_2 + TiO_2 + La_2O_3$ | 0–10 |
| $As_2O_3 + Sb_2O_3$ | 0–2 |
| Cl | 0–1.5 |
| $Nio + V_2O_5 + Nd_2O_3 + CuO + CoO + Fe_2O_3 + MnO_2 + Cr_2O_3$ | 0–5 |
| F | 3–8 |

U.S. Pat. No. 3,737,294 is also directed to the hot forming of laminated glass articles by bringing streams of molten glass together in general accordance with the method described above in U.S. Pat. No. 3,673,049, the difference in method involving the viscosities of the streams of glasses being brought together. The patent cites the same group of spontaneous opal glass compositions as being particularly useful for core portions in three-ply laminates as is described in U.S. Pat. No. 3,673,049.

U.S. Pat. No. 3,649,440 discloses the thermal tempering of multi-ply laminated glass articles, hot formed from streams of molten glass, wherein the laminae are alternately in compression and tension, to significantly improve the impact resistance of the articles and inhibit spontaneous breakage arising via bruise checks. The patent provide examples of three-ply laminates wherein the interior portion is an opal glass. No glass compositions are claimed per se but ranges developed from the specific spontaneous opal glasses tabulated in the patent consisted, by weight on the oxide basis, of

| | |
|---|---|
| $SiO_2$ | 64–66.4 |
| $Al_2O_3$ | 6.2–6.3 |
| $B_2O_3$ | 1.3–4.5 |
| MgO | 0.7–0.9 |
| CaO | 13.6–15.7 |
| $Na_2O$ | 2.1–4.4 |
| $K_2O$ | 1.5–4.1 |
| F | 2.7–4.4 |

U.S. Pat. No. 3,661,601 is drawn to compositions especially suitable as spontaneous opal glass core portions for three-ply laminates. The base glasses therefor consist essentially, as expressed in weight percent on the oxide basis, of 50–75% $SiO_2$, 3–9% $Al_2O_3$, 11–20% CaO, 1–7% $B_2O_3$, and 3–10% $Na_2O+K_2O$ consisting of 0–7% $Na_2O$ and 0–7% $K_2O$. The patent notes that MgO may be present as an optional ingredient up to 3%, with the caveat that its presence can reduce the opacity of the glass. The MgO content in the sole working example recorded in the patent containing MgO was 0.7%.

A glass commercially viable as a spontaneous opal core glass in a three-ply glass laminate suitable for tableware will be the result of an appropriate compromise of melting, forming, physical, and chemical properties. Hence, the glass must exhibit the necessary viscosity and liquidus parameters to permit the bringing of a stream thereof into contact with a stream of the skin glass. The glass should demonstrate good resistance to devitrification in the presence of platinum and refractory ceramic forming members and melting unit structures. The glass is required to opalize spontaneously to a body which is densely opaque even in thin cross section. Finally, the core glass must remain relatively stable when subjected to subsequent heat treatments encountered during the application of decorations thereto.

A typical analysis of the core glass utilized in the CORELLE ® brand tableware ranges about:

| | |
|---|---|
| $Al_2O_3$ | 6.25 ± 0.1 |
| $Na_2O$ | 3.05 ± 0.1 |
| $K_2O$ | 2.95 ± 0.1 |
| MgO | 0.7 ± 0.1 |
| $B_2O_3$ | 4.7 ± 0.1 |
| F | 3.45 ± 0.1 |
| CaO | 15.0 ± 0.15 |
| $Fe_2O_3$ | 0.06 ± 0.03 |
| $SiO_2$ | 64.0 ± 1.0 |

The MgO and $Fe_2O_3$ contents are not added as specific components but find their way into the glasses as impurities in the raw batch materials or cullet utilized in the melting process.

As is explained in U.S. Pat. No. 3,661,601, supra, as the molten glasses of that disclosure are cooled, an amorphous opacifying phase is formed which consists of phase separated droplets. Those droplets are believed to contain CaO and F or CaO, F, $B_2O_3$, and $SiO_2$ with X-ray diffraction analyses of the droplets showing that the droplets are non-crystalline. However, upon heat treatment at temperatures above the annealing point of the glass, the droplets become crystallized, the extent of crystallization being dependent upon the time and temperature of the heat treatment.

As has been discussed above, the high mechanical strength exhibited by the three-ply laminates results from the differences in thermal expansion existing between the core and skin glasses, the skin glass having a lower coefficient of thermal expansion than the core glass so as to develop a surface compression layer on the body. However, this difference in thermal expansion cannot be of such magnitude as to lead to the development of excessively high central tension. Rather, the force exhibited upon ware breakage should be relatively mild, resulting in but a few large pieces. Hence, the respective compositions of the skin and core glasses must be carefully monitored.

In the past, CORELLE ® brand tableware had been decorated with various glazes and enamels which required about a five-minute heat treatment at temperatures above the annealing point, but below the softening point of the ware. However, when different decorations were desired which involved substantially longer heat treatments at similar temperatures, e.g., 15 minutes, the mechanical strength of the laminated product sharply decreased.

Examination of the core glass and skin glass after that latter heat treatment by means of electron microscopy and X-ray diffraction analysis manifested no crystallinity in the skin glass but a significant crystal content was observed in the core glass. Two distinct phases were identified in the core glass, viz., $CaF_2$ and crystals having a xonotlite structure. Xonotlite is a fibrous hydrated silicate of calcium whose chemical composition $Ca_6Si_6O_{17}(OH)_2$ is closely related to that of wollastonite ($CaSiO_3$). In the opal core glass the hydroxyl group is most likely replaced by fluorine which has the same charge and approximately the same ionic radius. The composite core body having an overall coefficient of thermal expansion less than that of the crystal-free glass. This lowering of expansion coefficient leads to a decreased differential existing between that of the skin glass and the core glass with consequent reduction in surface compression and loss of mechanical strength in the laminated body.

Therefore, the principal objective of the present invention is to limit development of crystallization in the core glass, especially the low expansion crystals having a xonotlite structure, without deleteriously affecting the other properties of the glass when the laminate is heated to temperatures above the annealing point thereof but below the softening point.

SUMMARY OF THE INVENTION

We have found that this objective can be achieved through the inclusion of MgO in an amount of 1.25±0.3 percent by weight into the base composition of the core glass commercially utilized in the CORELLE ® brand tableware. Because MgO tends to raise the coefficient of thermal expansion of the core glass, care must be observed in its addition such that stress levels will not be reached where excessive breakage forces will be experienced. Accordingly, we have determined that the preferred MgO content will range between about 1-1.5% by weight with the most preferred compositions containing 1.05±0.05%. Thus, X-ray diffraction analyses have indicated that the presence of about 1% MgO in the glass composition will greatly reduce the overall crystallization and will essentially eliminate the generation of crystals having a xonotlite structure. At MgO levels of 1.4%, all crystallization is essentially absent.

An explanation for the lower crystallinity with increasing MgO content has not been fully devised as yet, although the mechanism through which it acts is deemed to either affect the composition of the phase separated droplets and/or the rate at which the droplets crystallize. It is speculated that the MgO enters the droplets but this has not been rigorously proven.

The inventive compositions consist essentially, as expressed in weight percent on the oxide basis, of about:

| | |
|---|---|
| $SiO_2$ | 64.5 ± 2.0 |
| $Al_2O_3$ | 6.25 ± 0.5 |
| $Na_2O$ | 3.0 ± 0.5 |
| $K_2O$ | 3.0 ± 0.5 |
| MgO | 1.25 ± 0.3 |
| $B_2O_3$ | 4.5 ± 0.7 |
| F | 3.25 ± 0.5 |
| CaO | 14.5 ± 1.0 |

DESCRIPTION OF THE PREFERRED EMBODIMENTS

Table I records the compositions of several glasses, analyzed in terms of weight percent on the oxide basis (the $SiO_2$ obtained by difference), which were melted in the laboratory to determine the effect of MgO content upon the development of crystallization therein upon heat treatment of the glass. Because all the cations with which fluorine is combined are not known, it is simply reported as fluoride in accordance with customary glass analysis practice.

The glasses were prepared by compounding appropriate batch materials, melting the batches at temperatures of about 1400°–1500° C., forming glass articles of desired geometries from the melts, and cooling those articles to room temperature. Thereafter, the articles were heat treated to temperatures of about 800° C., quick chilled in an air blast to temper them, and then cooled to room temperature.

X-ray diffraction analyses and electron microscope examinations were then conducted on the heat treated articles. The results of those investigations are reported in Table II below.

TABLE I

| | 1 | 2 | 3 |
|---|---|---|---|
| $SiO_2$ | 66.08 | 63.5 | 65.92 |
| $Al_2O_3$ | 6.21 | 6.34 | 6.17 |
| $Na_2O$ | 2.87 | 3.04 | 2.87 |
| $K_2O$ | 2.94 | 2.88 | 2.94 |
| MgO | 0.82 | 1.14 | 1.41 |
| $B_2O_3$ | 4.21 | 4.75 | 3.95 |
| F | 2.98 | 3.41 | 2.92 |
| CaO | 13.89 | 14.88 | 13.84 |
| $Fe_2O_3$ | — | 0.06 | — |

TABLE II

| Example No. | Time of Heat Treatment | Amount of Crystallinity | Identity of Crystallinity |
|---|---|---|---|
| 1 | 5.5 minutes | None | — |
| 1 | 14.5 minutes | Medium | Xonotlite + $CaF_2$ |
| 2 | 5.5 minutes | None | — |
| 2 | 14.5 minutes | Low | $CaF_2$ + little Xonotlite |
| 3 | 5.5 minutes | None | — |
| 3 | 14.5 minutes | None | — |

A study of Tables I and II clearly illustrates that increasing the MgO content of the glass not only causes a significant decrease in the overall amount of crystallinity developed upon subsequent heat treatment of the opalized body, but also reduces the quantity of crystals having a xonotlite structure, which phase sharply lowers the coefficient of thermal expansion of the glass. Thus, the inclusion of about 1% MgO in the base core glass composition will impart an improvement in mechanical strength to the heat treated three-ply laminate with further additions enhancing the strength still more. The effect which MgO has not only upon the limitation of the development of crystals in the core glass, but also upon the coefficient of thermal expansion of the glass permits the tailoring of the mechanical strength of the laminate to a predetermined value.

We claim:

1. A spontaneous opal glass composition which limits the development of $CaF_2$ crystals and crystals of xonotlite structure therein, when the glass is heated at temperatures in excess of the annealing point but less than the softening point thereof, consisting essentially, as analyzed in weight percent on the oxide basis, of about:

| | |
|---|---|
| $SiO_2$ | $64.5 \pm 2.0$ |
| $Al_2O_3$ | $6.25 \pm 0.5$ |
| $Na_2O$ | $3.0 \pm 0.5$ |
| $K_2O$ | $3.0 \pm 0.5$ |
| MgO | $1.25 \pm 0.3$ |
| $B_2O_3$ | $4.5 \pm 0.7$ |
| F | $3.25 \pm 0.5$ |
| CaO | $14.5 \pm 1.0$ |

2. A spontaneous opal core glass composition in accordance with claim 1 wherein said MgO content ranges about $1.05 \pm 0.05\%$.

* * * * *